Aug. 1, 1972    J. E. LEONARD ET AL    3,681,136
METAL-METAL SALT ELECTRODES AND PROCESS
Filed March 2, 1970    2 Sheets-Sheet 2

INVENTORS.
JOHN E. LEONARD
HIDEO WATANABE
BY
FOWLER, KNOBBE
& MARTENS
ATTORNEYS.

United States Patent Office 3,681,136
Patented Aug. 1, 1972

3,681,136
METAL-METAL SALT ELECTRODES AND PROCESS
John E. Leonard and Hideo Watanabe, Fullerton, Calif., assignors to International Biophysics Corporation, Irvine, Calif.
Filed Mar. 2, 1970, Ser. No. 15,516
Int. Cl. B44d 1/44
U.S. Cl. 117—230                17 Claims

ABSTRACT OF THE DISCLOSURE

A process for fabricating metal-metal salt electrodes comprising forming a coating of a binary metal salt composition on a metal substrate and leaching a soluble component from the composition. A porous metal salt coating is thereby formed on the metal substrate. Preferably the binary salt composition is a eutectic composition which has a low melting point and provides a porous structure after leaching.

---

This invention is directed to a process and an electrode component for the measurement of electromotive forces and more particularly to metal-metal salt reference electrodes for measurements of biologically produced and induced electrical impulses and to a process for producing such electrodes.

The essential properties of a good reference electrode are a stable known potential achieved by the choice of pure materials, thermodynamic reversibility determined by intrinsic properties of the metal and ion selected, and resistance to polarization, i.e. a large exchange current at equilibrium to permit the electrode to pass small currents without appreciable departure from reversible operation. Polarization is inversely proportional to the effective surface area of the electrode. Thus, high effective surface areas are desirable.

Another property which a good reference electrode should have is the ability of the electrode to reach equilibrium quickly. In order for the electrode to reach equilibrium quickly it is necessary that there be a short ionic migration path between the metal salt and metal so that the ions can be transferred the entire path length through an electrolyte in either direction within a short time. In addition to the technical requirements, the electrodes must be easy and inexpensive to fabricate.

The stable electrode potential, the thermodynamic reversibility and the resistance to polarization are all interdependent electrode properties. Consequently, it is difficult to produce high quality electrodes since it is necessary to sacrifice one electrode property to improve the other.

The prior art electrodes characteristically require quite a long time to reach potentiometric equilibrium. Normally it takes several hours for any of the presently manufactured reference electrodes to reach equilibrium.

Classical methods of fabrication of the metal-metal salt electrodes often require complex time consuming procedures to prepare the materials and form the electrodes to assure that the product will be of acceptable properties. Such complex time consuming procedures raise the cost of fabrication of the electrodes but nevertheless must be precisely followed because prior art fabrication techniques which beneficially affect one of the essential electrode properties often have adverse affects on the other properties.

Some prior art electrode fabrication processes such as described in Pat. No. 3,111,478 to Watanabe, issued Nov. 19, 1963, form a pressed pellet of a metal and metal salt mixture, for example silver and silver chloride. These type processes, although capable of producing high standard electrodes, require the use of very high pressures and inherently suffer from the die corrosion and contamination associated with high pressure powder metallurgy. These processes, due to their high energy and tooling requirements, are expensive. The pressed electrode pellets, if porous enough to have a desired low D.C. resistance, characteristically require a long time to reach potentiometric equilibrium.

Other commonly used methods for producing reference electrodes include electroplating a metal on a platinum base and then electrolytically oxidizing a portion of the metal to a metal salt. The plating is slow and often periods of up to 48 hours washing time are necessary to remove the plating chemicals. For example the metal may be silver, the metal salt silver chloride.

Another process for producing the silver-silver chloride reference electrode is by thermally decomposing a mixture of silver oxide and silver chlorate on a platinum wire. Both of these processes require a high degree of preparation and verification of the purity of the chemicals. Here again a long leaching and washing procedure is required to remove the contaminating chemicals such as perchlorates and other reaction products of the thermal decomposition.

This invention is directed to a process for producing reference electrodes and to the electrodes formed thereby. The process comprises forming a composition comprising a first or active metal salt and a second or inactive metal salt, coating this composition on a metal substrate and leaching out the inactive metal salt to leave a porous coating on the metal substrate.

Preferably the composition of the metal salts should be within 15% by volume of the eutectic composition of the binary salt system. The use of the eutectic composition is critical in reducing the thermal requirements for melting the salt system and in obtaining a physically desirable eutectic structure coating after leaching. If no eutectic is formed in the binary salt system, good electrode properties can still be obtained if the composition contains at least 25% by volume of the active metal salt but not more than 90% by volume of the active metal salt. It has been found that if less than 25% by volume of the active metal salt is used the coating is too porous to form a durable electrode. If greater than 90% by volume of the active salt is used the final coating does not have sufficient porosity to exhibit good electrode properties and the melting temperature approaches that of the pure active salt which in most cases is too high to be economically feasible. These limits on operability also apply to eutectic salt systems, i.e. any composition with the active metal salt within the 25% by volume to 90% by volume range is operative with best results being obtained within 15% by volume of the eutectic composition. The porosity of the active metal salt coating in the final electrode is about equivalent to the volume percent of inactive salt and thus varies from about 10% to about 75%. The porosity for the preferred eutectic systems is determined by the amount of inactive salt present which is removed by leaching.

The term "active" is used to define the salt which is not removed by leaching and thus is active in the electrode. Similarly, the "inactive salt," as used herein, is removed by leaching and does not ultimately form a part of the electrode. All compositional percentages referred to herein unless otherwise specified are percentages by volume.

While the metal-metal salt electrodes are preferably formed from silver-silver chloride, the electrodes can be formed from other metal-metal salt combinations which produce a potential by ionization of the metal salt in an appropriate electrolyte. For example, the choice of metals and active metal salts is limited only by those which function electrochemically to produce an electromotive force indicative of the biological or other condition being investigated. The same materials which are used in convention electrode components may be utilized. Preference is given, however, to active metal salts which can be combined to form a composition with a more soluble inactive metal salt and then withstand leaching to remove the soluble metal salt.

The more soluble metal salt which is removed by leaching serves only as an electrochemically inactive component which is necessary to achieve the desired final porous physical structure of the metal salt coating. The inactive anion should be of equal or lower chemical activity than the anion of the active salt so that it will not displace the active salt anion. Generally, the best results have been obtained when the same anions are used for the active and inactive salts, e.g. silver chloride-sodium chloride. Some relatively low activity anions which may be used are the soluble sulfates and nitrates.

The preferred inactive metal salt which forms a eutectic system with silver chloride is potassium chloride. The eutectic is at 69.5 mole percent or 61 volume percent silver chloride and 30.5 mole percent or 39 volume percent potassium chloride. In accordance with the previously discussed critical range for getting sufficient eutectic structure to provide superior electrode properties, the silver chloride should comprise from about 45 to 75 volume percent of the salt system. The eutectic melting point of the solution is about 306° C. Upon solidification the eutectic appears to form regular eutectic structure alternating platelets of silver chloride and potassium chloride. The leaching with water leaves a porous layer of silver chloride on the pure silver substrate. The porosity of the silver chloride is from 25 to 55% or about equal to the amount of potassium chloride removed.

Other eutectic binary salt systems which, although less desirable than the silver chloride-potassium chloride system, include lead chloride-silver chloride (eutectic at 55% $PbCl_2$ and 45% AgCl), thallium chloride-silver chloride (eutectic at 49% TlCl and 51% AgCl and at 66% TlCl and 34% AgCl), cuprous chloride-silver chloride (eutectic at 55 mole percent CuCl and 45 mole percent AgCl), and rubidium chloride-silver chloride (eutectic at 60 mole percent RbCl and 40 mole percent AgCl). These binary systems are less desirable than the potassium chloride-silver chloride system because the inactive salts are less soluble in water than potassium chloride and thus longer leaching times are required. With a system such as silver chloride-rubidium chloride, however, the eutectic melting point is depressed to about 251° C. so that energy requirements are low.

In one embodiment of the process of this invention a pure silver substrate is formed as a silver button. A melt of high purity silver chloride and a water soluble salt such as sodium chloride, potassium chloride or rubidium chloride is formed. The salt may form a eutectic system with silver chloride as with potassium chloride and rubidium chloride or be soluble throughout the system as with sodium chloride.

After the melt of silver chloride and the inactive salt has been formed, the melt is solidified in the form of prills or as a solid mass which is comminuted to form small particles of the solidified materials. These particles are then placed on the upper surface of the pure silver button and the entire button and particulate materials are placed in a heat treating furnace where the temperature is raised above the melting point of the binary salt composition. This causes the composition to melt and form an adherent coating on the surface of the silver button.

After the coating is permitted to solidify, the button is rinsed in water to remove the water soluble salt from the metal salt mixture. The rinsing time is dependent on the water temperature and the amount of soluble salt present. Times of approximately 15 minutes have been found satisfactory with hot water (above 100° F.) in most cases. The time required to leach out the soluble salt with other metal salt combinations can easily be determined in the laboratory, however. Removal of all of the soluble metal salt leaves a porous silver chloride coating on the pure silver substrate. Electrodes formed in this manner have been found to have superior properties to those produced by any of the conventional processes.

Some other electrode materials include other silver-silver halide electrodes, for example the iodide and the bromide electrodes are usable. The metal sulfates or nitrates such as silver-silver sulfate electrodes may also be used. Other metals which may be used instead of silver include copper, as in the copper-copper nitrate electrode or bismuth as in the bismuth-bismuth fluoride electrode. The principles of the process of this invention are believed applicable to any metal-metal salt electrode which produces an EMF electrochemically and in which the metal salt forms a liquid solution with another metal salt which is more soluble in a leaching solution. The preferred leaching material is water. It is clear, however, that any liquid which preferably dissolves the non-participating "inactive" metal salt can be used.

One of the features of this invention is that it provides a low D.C. resistance electrode with an extremely short equilibrium time. Another feature of this invention is that it enables the production of reference electrodes in relatively short periods of time at low cost. These and other features of this invention will become more readily apparent from the following description and appended claims when taken in conjunction with the attached drawings which illustrate a preferred process and product of this invention wherein:

Figure 1:
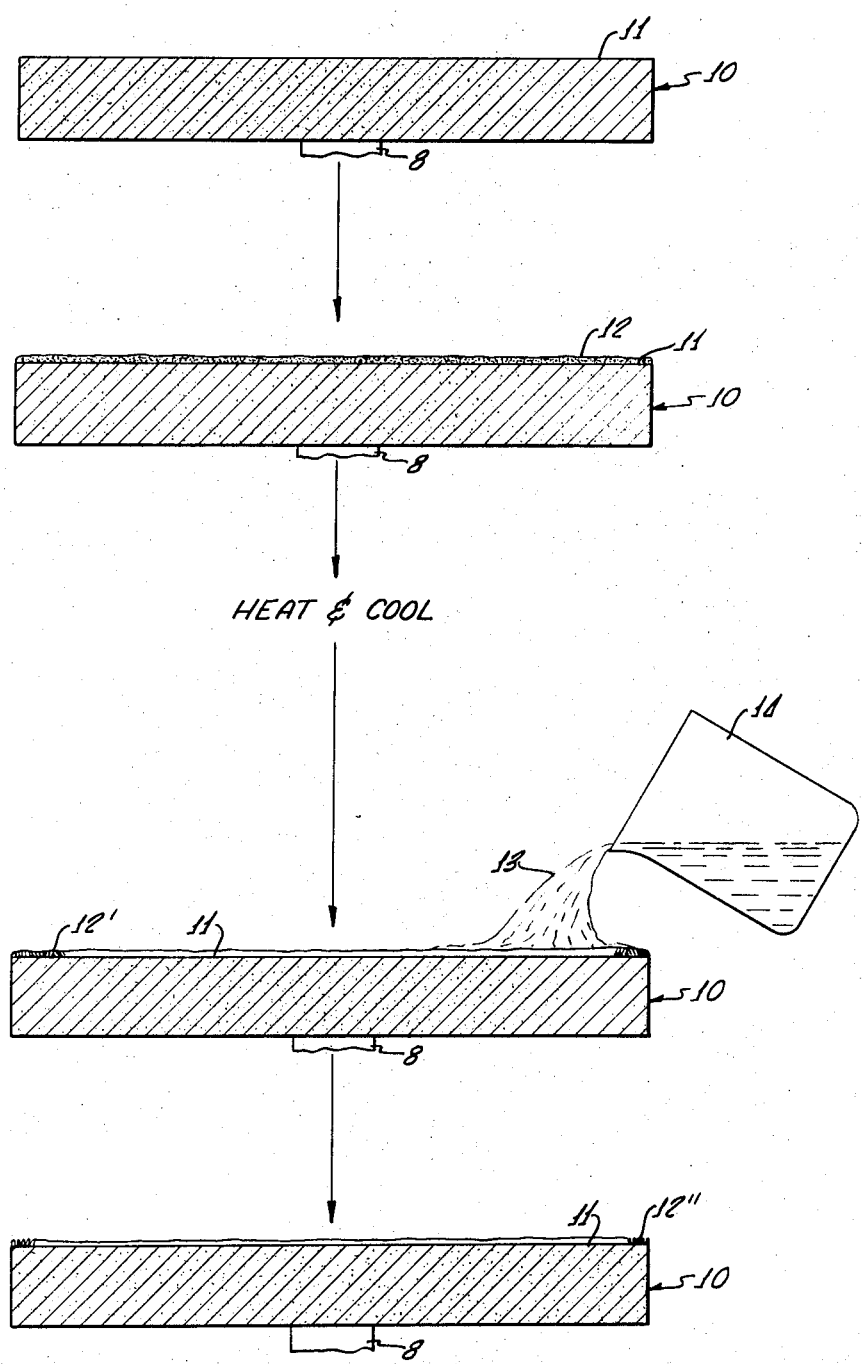
FIG. 1 is a somewhat diagrammatical representation of the process of this invention.

Referring now to FIG. 1, which diagrammatically shows the manner in which the electrodes of this invention are formed, in the first step it will be seen that a stem 8 is provided on a metal button or rivet-like substrate 10 which may be silver, copper, bismuth or other conductive metal. The substrate 10 has a clean upper surface 11 which is to be coated. The preferred substrate metal is silver and the preferred electrode is silver-silver chloride. While many different metal salt electrodes can be formed by the process of this invention, the process and electrode for purposes of clarity will be discussed with reference to a silver-silver chloride electrode and a silver chloride-potassium chloride salt system.

In the second step a solid particulated binary salt composition 12 is evenly distributed on the surface 11 of the metal substrate 10. This particulated composition preferably is eutectic formed from about 61 percent silver chloride and 39 percent potassium chloride. This eutectic composition melts at a temperature of 306° C. and is though to solidify in the typical eutectic platelet structure. The eutectic particles may be formed by prilling a melt of the eutectic composition 12 or by solidifying the composition and then comminuting as with a balling mill or crucible and pestle.

The prilling is accomplished by spraying the melt through atomizer orifices (not shown) into the air to permit solidification. The prilled particles may be adjusted to range from .001 to .005 inch across by varying the orifice sizes. The particle size of the comminuted solids is not critical but preferably should be below 100 mesh so that the particles can be uniformly distributed on the surface 11 of the metal substrate. For miniaturization of the electrodes, of course, it may be necessary to further reduce the particle size.

Figure 4:
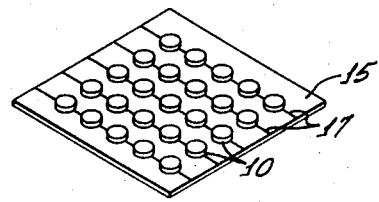
FIG. 4 is a perspective view of a heating tray showing a plurality of metal substrates arranged thereon.

In the preferred embodiment of this invention, as shown in FIG. 4, several of the metal substrates 10 are positioned on a tray 15 which is provided with a plurality of grooves 17 which hold the stems 8 of these metal substrates. Then the eutectic is evenly spread across the surface of the tray so that all of the substrates are coated in a uniform manner. The tray 15 is then processed in accordance with the diagram of FIG. 1 so that all of the metal substrates on the tray are processed simultaneously to fabricate a plurality of electrodes.

The metal substrate 10 is then heated to a temperature above the melting point of the eutectic composition as shown in the third step of FIG. 1. Melting of the solidified eutectic causes the eutectic to flow across the surface 11 of the metal substrate thereby wetting the surface to form a layer of the binary salt composition on the surface of the metal substrate. The silver chloride-potassium chloride melt which solidifies is generally homogeneous. This melt adheres readily to the silver surface and provides a smooth coating thereon.

The coating formed in this manner usually is about 100 microns thick. The coating thickness is varied by varying the temperature of the metal salt and the substrate. For example, the thickness of the silver chloride-potassium chloride is maintained at about 100 microns by heating the salt solution to from about 350° C. to 400° C. At higher temperatures the salt viscosity decreases and the coating thickness is less. The preferred thickness varies from 50 to 500 microns with the most preferred coating thickness being about 100 microns. This is true since with thinner coatings there is an insufficient amount of the silver chloride salt after leaching to enable the electrode to function properly. If the coatings are thicker than about 500 microns, the path of ionic diffusion between the extreme portions of the salt and the silver substrate is longer than desirable and detrimentally affects the time required for the electrode to reach potentiometric equilibrium. Thicker coatings can be tolerated for some applications of the electrode, however. It also has been found that the coating does not have to be uniformly thick. For example good results can be obtained even though some portions of the substrate surface appear microscopically to have no coating thereon.

In FIG. 1 it will be seen that the melt is permitted to cool enabling the eutectic system to once again solidify on the silver substrate in layer 12' shown in the fourth step. This coating is substantially the same thickness as the molten layer and contains a homogeneous mixture of silver chloride and potassium chloride.

Leaching is accomplished as shown in the fourth step of FIG. 1 by washing the layer 12' with water from an appropriate source such as beaker 14 shown in FIG. 1. The leaching, which is shown diagrammatically in FIG. 1, can be accomplished with a continuous water supply or by merely permitting the coated substrates to soak in a container of water for a sufficient time to dissolve the soluble salt. With hot water on the order of 100° F. or higher the leaching time can be maintained at less than 15 minutes. With room temperature water, the time for leaching is still usually less than about 2 hours for the AgCl-KCl eutectic composition.

Figure 2:
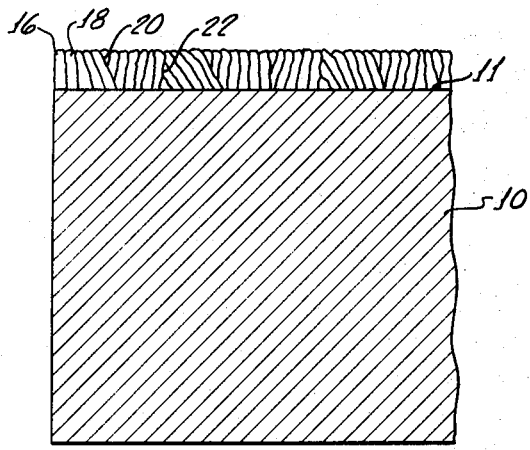
FIG. 2 is an enlarged view of the solidified eutectic structure of a binary salt system applied to a metal substrate as shown in FIG. 1.

The theoretical structure of the eutectic composition of FIG. 1 prior to leaching is shown in FIG. 2. The theoretical eutectic structure has alternating platelets of silver chloride 16 and potassium chloride 18. The observed structures at the eutectic composition appear to correspond to the theoretical structure of FIG. 2 with some dendritic solidification. The platelets intersect one another at grain boundaries such as 20 and 22 so that the platelets are not regularly oriented in the eutectic structure with respect to the substrate 10. The cooling rate of the melt should preferably be slow enough to permit equilibrium formation of the eutectic structure. Equilibrium cooling generally occurs without special treatment because the metal substrate 10 acts at a heat sink for the thin coating 12. When the eutectic composition of metal salts has been used to form the coating, a general structure similar to that shown in FIG. 2 has been regularly observed. Excellent results have been obtained, however, within 15 percent by volume of the eutectic composition and within the 25 to 90 percent by volume silver chloride limits on operability. As the composition is varied from the eutectic the amount of the characteristic eutectic structure decreases. Additionally the temperature required to melt the salt composition increases as the composition varies from the eutectic.

Figure 3:
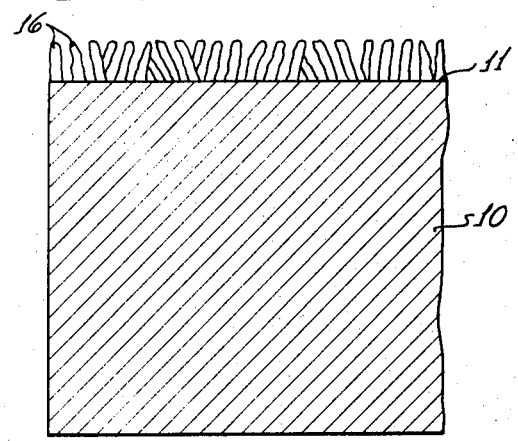
FIG. 3 is an enlarged view of a metal substrate and active metal coating after leaching as shown in FIG. 1.

After the leaching step as shown in the last step of FIG. 1, all of the potassium chloride platelets 18 are removed leaving a structure which theoretically comprises spaced silver chloride platelets as shown in FIG. 3. This structure of the coating is of a regular porosity and provides ready access for the electrolyte to the silver substrate 10. The excellent properties observed with coatings formed from eutectic compositions of metal salt mixtures are believed to be dependent on this somewhat regular structure.

It has been found that when a silver chloride-potassium chloride composition within the range of 45 to 75 percent by volume silver chloride is used, the coating after leaching is durable and has excellent electrical properties. A summary of the properties of such a silver-silver chloride electrode is shown in Table I compared with the properties of conventional type electrodes.

TABLE I

| Manufacturing method silver-silver chloride electrode | D.C. resistance (ohms/ cm. at 0.1 μa.) | Equilibrium time (to 200 μv. offset) |
| --- | --- | --- |
| Classical (electrolytic, thermal-electrolytic, thermal). | 100–200 | 24 to 48 hours. |
| Pressed pellet | 100–200 | 3 to 18 hours. |
| Fused silver chloride coating | 3,000–6,000 | 3 to 5 minutes. |
| Porous silver chloride from eutectic-smooth silver surface. | 300–500 | 0.5 to 3 minutes. |
| Porous silver chloride from eutectic-roughened silver surface. | 150–250 | Do. |

With the silver chloride-potassium chloride system it has been found that the D.C. resistance at 90% silver chloride is still only about 600 ohms. As the percentage of silver chloride increases above 90%, the D.C. resistance increases greatly. The resistance of fused silver chloride alone being from 3,000 to 6,000 ohms as shown in Table I. While any addition of a leachable metal salt to provide some porosity in the coating is beneficial, 90% has been found to be a practical limit on the amount of active metal salt used both in electrode charactetristics and economically.

Figure 5:
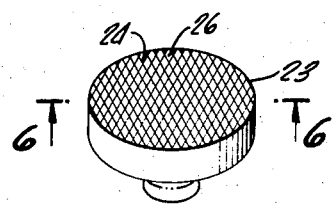
FIG. 5 is a perspective view of a metal substrate surface prepared for receiving a binary metal salt melt in accordance with this invention.
Figure 6:
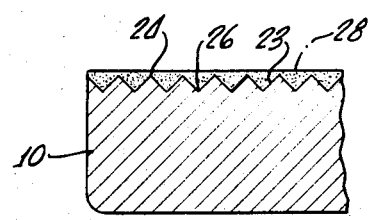
FIG. 6 is an enlarged partial sectional view of the metal substrate of FIG. 5 taken substantially along lines 6—6 of FIG. 5.

Referring now to FIGS. 5 and 6, it has been found that the electrode characteristics may be improved by roughening or engraving the substrate surface to be coated such as surface 23 of FIG. 5. Best results have been obtained by roughening the surface in a regular manner to form a waffled surface having a series of peaks 24 and valleys 26. Such a surface has been formed by pressing an iron screen into the surface with a mechanical press or by the use of a conventional knurling tool. On one such roughened surface the valleys were .003 inch deep and had center-to-center spacings of .010 inch. Generally they were added to roughen the surface area of the silver substrate so that the molten salt composition would adhere thereto. The roughened substrate surface additionally increased the surface area of the substrate with respect to the metal salt and also provided indentations which retained the metal salt when it was heated above its eutectic melting temperature. These indentations 24 as shown in FIG. 5 retain the melt 28 and provide a large surface area of metal salt after leaching. The peaks 24 of the surface increase the surface area contact of the metal substrate with the metal salt and, in general, produce an improvement in the D.C. resistance of the electrode as shown in Table I.

The overall fabrication time of the electrodes has been reduced from several hours or days to a period of less than 45 minutes and with appropriate leaching steps with flowing hot water the total fabrication time for several electrodes at one time can be reduced to less than 15 minutes per electrode. In addition the electrical characteristics of the electrodes of this invention are better than those produced by the more complex fabrication methods. For example as Table I shows the time required to reach equilibrium with the silver-silver chloride electrode produced by the process of this invention is less than 3 minutes as opposed to hours for those electrodes with acceptable resistance values produced by conventional methods. It is believed in part at least that this rapid equilibrium time is achieved by the regular porosity and structure of the metal salt coating which is applied to the metal.

Rather than forming the coating by melting the solidified eutectic composition it has also been found possible to press the particulate salt composition onto the surface or to dip the surfaces of the metal substrates into a molten bath of the eutectic composition or other binary salt composition. It is thought that is should also be possible to coat the substrate by flame spraying a molten solution of metal salts thereon. These procedures do not lend themselves as readily to mass fabrication of the electrodes and are thus less preferred. Additionally to form an adherent coating which cools under equilibrium conditions it has been found that the substrate should be either preheated to the salt temperature or maintained within the salt until it reaches that temperature. For example, for production of a small number of electrodes the silver rivets are placed on a heated ceramic surface with the surface to be coated in contact with the ceramic. The metal salt solution is permitted to wet another heated flat ceramic surface at about 400° C. The rivets are dipped one at a time with tweezers into the molten salt. Many electrode components have been produced this way and exhibit excellent properties.

Figure 7:
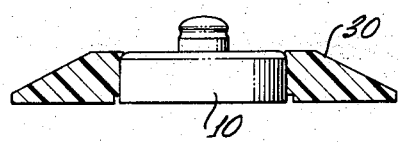
FIG. 7 is a representative partial sectional view of an electrode formed by the process of this invention.

After the porous coatings have been formed on the metal substrate, as shown in FIG. 7 a skirt 30 may be attached about the surface of the button 10 for use as a bioelectrode for example as an EKG electrode or other biological impulse sensing electrode. In some cases, where the electrode assembly is press fitted together, it has been found advisable to leach the coating after assembly so that the surface of the active salt is not contaminated or damaged. The skirt 30 lends itself readily to use as a skin contact electrode in such measurements. The skirt 30 and finally fabricated electrode are shown for purposes of illustration only, however, and it should be clear that the electrode could be used in any of the conventional manners that silver-silver chloride or other metal-metal salt electrodes are commonly used.

A list of other metal salt eutectic compositions which have been found to be operable in this invention along with their melting points is presented in Table II.

TABLE II

| Mole percent: | Melting temp., ° C. |
|---|---|
| 40 $PbCl_2$-60 AgCl | 310 |
| 42 TlCl-58 AgCl | 210 |
| 60 TlCl-40 AgCl | 253 |
| 55 CuCl-45 AgCl | 260 |
| 40 RbCl-60 AgCl | 251 |

It has been found that the effective average thicknesses of the silver chloride coatings formed by the process of this invention are less than 100 microns. This has been discovered as a result of microscopic measurements and additionally by observation of the equilibrium time. The electrodes of this invention reach equilibrium in 100 to 200 seconds under an electric field of .5 volt. Under such a voltage the thermal diffusion velocity for a typical monovalent ion is of the order of 0.5 micron per second. The computed thickness of the layers for such equilibrium times are less than 100 microns.

One binary salt composition which does not have a eutectic but which has been found to work satisfactorily within the range of 25% of the active metal salt to 90% of the active metal salt is the sodium chloride-silver chloride system. Sodium chloride, as potassium chloride, is readily soluble in water so that leaching is not a problem. Sodium chloride-silver chloride binary salts can be used in the process of this invention to produce satisfactory electrodes in a period of less than 15 minutes.

While the preferred leaching solution is water which is free of contaminating impurities, such as distilled water, it should be clear that other leaching solvents such as weak acid solutions or organic solvents can be used if the inactive metal salt which is to be removed by leaching is substantially more soluble in the solvent than the active metal salt. The only limitation on the solvent is that it must not detrimentally affect the active metal salt or the metal substrate. For example, the solvent must not form an insulating coating on either the metal substrate or on the metal salt coating. Additionally the solvent must not dissolve substantial quantities of the active metal salt.

While the process of this invention has been discussed primarily with the use of a binary salt solution, it should be understood that a combination of the soluble inactive metal salts can be used. For example to the sodium chloride-silver chloride binary salt system some silver nitrate or sodium nitrate can be added. Small amounts, up to 5 volume percent, lower the melting temperature of the salt system and, since the nitrates are also water soluble, will not detrimentally affect the final structure of the coating. This addition of a third metal salt is only limited by the fact that the salt or salts that are added will have on the active salt coating after leaching. Generally it can be stated that the added salt must be soluble in the solvent for the inactive salt and must be capable of liquid solution in the binary salt system. As noted it has been discovered that salts such as sodium nitrate, potassium nitrate and silver nitrate will work satisfactorily. It is believed that the sulfates such as sodium sulfate or potassium sulfate will also work satisfactorily.

The process of this invention while capable of utilizing any of the mixtures of salts which are contemplated is not limited to any particular mixture of salt. While the practical limits of the process are 25 volume percent of the active metal salt to 90 volume percent of the active metal salt in the binary salt composition, it should be noted that when a eutectic is present in the binary salt system the preferred composition is the eutectic composition to obtain the eutectic structure and the benefit of the low melting point. Additionally the most preferred range is 15 volume percent in each direction from the eutectic composition within the 25 volume percent to 90 volume percent range of acceptable operability.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for producing a metal-metal salt electrode component comprising the steps of:

providing a substantially pure metal substrate;

forming a molten solution of a first metal salt and a second metal salt which can be leached from the solution when it is solidified;

contacting the metal substrate with the molten solution;

solidifying the solution on the substrate by permitting the molten solution and the substrate to cool below the melting point of the solution; and leaching the second metal salt from the solidified salts by contacting the cooled salt solution with a solvent for the second metal salt to provide a porous coating of the first metal salt on the substrate.

2. A process as defined in claim 1 wherein said electrode component is formed from a silver metal substrate and the first metal salt is silver chloride.

3. A process as defined in claim 1 wherein said metal salt solution is formed by mixing from 25 to 90 percent by volume of said first metal salt with said second metal salt.

4. A process as defined in claim 3 wherein said solution consists of first and second metal salts which form a eutectic system and the amount of said first salt does not vary more than 15 percent by volume from the eutectic composition.

5. A process as defined in claim 4 wherein said first metal salt is silver chloride, said second metal salt is potassium chloride and said solution comprises from 45 to 75 percent by volume silver chloride.

6. A process as defined in claim 1 wherein said metal substrate is contacted with said molten solution by covering a surface of said substrate with a solid composition of said first and second metal salts and heating the substrate and solid composition to a temperature above the melting point of said composition thereby melting said composition and permitting it to wet the surface of said substrate.

7. A process in accordance with claim 3 wherein said first metal salt is silver chloride and said second metal salt is sodium chloride.

8. A process for forming a metal-metal salt electrode having a porous metal salt deposited on a metal substrate comprising:

providing a metal substrate;

contacting the substrate with a molten solution comprising a first and a second metal salt, said first metal salt having said substrate metal cation and said second metal salt having an anion that will not displace the anions of said first metal salt, said first metal salt comprising 25 to 90 percent by volume of said solution;

heating the substrate to substantially the temperature of the solution of molten metal salts to enhance the adherence of the solution of metal salts to the substrate;

cooling the molten solution and the substrate to solidify the molten solution on the substrate; and leaching the solidified salt solution with a solvent which dissolves the second metal salt but not the first metal salt to remove the second metal salt and leave a porous coating of said first metal salt on said substrate.

9. A process as defined in claim 8 wherein said first and second metal salts form a eutectic system and wherein said solution comprises from not more than 15 percent by volume less than the eutectic composition amount of the first salt to not more than 15 p ercent by volume more of the first salt than the eutectic composition amount of the first salt.

10. A process as defined in claim 8 wherein the leaching solvent is water, said water being substantially free of contaminating impurities.

11. A process as defined in claim 10 wherein said water is heated to a temperature of more than 100° F.

12. A process as defined in claim 8 further including the step of deforming the surface of the metal substrate which is to be coated to provide an enlarged surface for coating and a roughened surface for retaining the molten solution thereon.

13. A process as defined in claim 8 wherein said heating and contacting steps comprise: forming a melt of said first and second metal salts; solidifying the melt of said salts; forming solidified particles of the salt solution; distributing the particles evenly on the surface of the substrate to be coated; and heating the substrate and the particles above the melting temperature of the solidified salt solution.

14. A process as defined in claim 8 wherein said heating and contacting steps comprise forming a melt of said first and second metal salts and dipping a surface of said substrate into said melt.

15. A process as defined in claim 13 wherein said particles are formed by extruding the melt through an atomizing orifice to form prills.

16. A process as defined in claim 13 wherein said metal substrate is substantially pure silver; said first metal salt is silver chloride; said second metal salt is potassium chloride; said solution comprises from 45 to 75 percent by volume silver chloride; and is heated to a temperature above 306° C. to melt said particles.

17. A process as defined in claim 16 wherein a plurality of electrode components are formed by simultaneously distributing particles on said substrates, heating said substrates in a common heating means at a temperature above 306° C. and thereafter substantially simultaneously leaching said substrates with water.

References Cited

UNITED STATES PATENTS 3,031,342  4/1962  Kertesz et al. _____ 117—102 R

RALPH S. KENDALL, Primary Examiner

U.S. Cl. X.R.

117—63, 120, 201